United States Patent
Klausmann et al.

(10) Patent No.: US 12,544,214 B2
(45) Date of Patent: Feb. 10, 2026

(54) VASCULAR PROSTHESIS

(71) Applicant: JOTEC GmbH, Hechingen (DE)

(72) Inventors: Marleen Klausmann, Hechingen (DE); Jan Ulmer, Sindelfingen (DE); Oezlem Oeztuerk, Geislingen (DE); Rainer Lesmeister, Wannweil (DE)

(73) Assignee: JOTEC GmbH, Hechingen (DE)

(*) Notice: Subject to any disclaimer, the term of this patent is extended or adjusted under 35 U.S.C. 154(b) by 0 days.

(21) Appl. No.: 17/665,804

(22) Filed: Feb. 7, 2022

(65) Prior Publication Data

US 2022/0151763 A1 May 19, 2022

Related U.S. Application Data

(63) Continuation of application No. PCT/EP2020/071974, filed on Aug. 5, 2020.

(30) Foreign Application Priority Data

Aug. 14, 2019 (DE) .................. 10 2019 121 930.2

(51) Int. Cl.
*A61F 2/07* (2013.01)
*A61F 2/852* (2013.01)
(Continued)

(52) U.S. Cl.
CPC .............. *A61F 2/07* (2013.01); *A61F 2/852* (2013.01); *A61F 2002/061* (2013.01);
(Continued)

(58) Field of Classification Search
CPC ...... A61F 2/07; A61F 2/852; A61F 2002/061; A61F 2002/067; A61F 2002/075;
(Continued)

(56) References Cited

U.S. PATENT DOCUMENTS 5,873,906 A * 2/1999 Lau ..................... A61F 2/92
606/198
6,165,210 A * 12/2000 Lau ..................... A61F 2/92
623/1.23
(Continued)

FOREIGN PATENT DOCUMENTS

DE 102006058186 A1 6/2008
DE 102009055969 A1 6/2011
(Continued)

OTHER PUBLICATIONS

International Preliminary Report on Patentability for International Application No. PCT/EP2020/071974, mailed Feb. 24, 2022.
(Continued)

*Primary Examiner* — Jing Rui Ou
(74) *Attorney, Agent, or Firm* — Jason H. Vick; Amped IP LLC

(57) ABSTRACT

The present invention relates to a vascular prosthesis for a blood vessel of a patient, comprising: a hollow cylindrical main body having a prosthetic material, a longitudinal axis (L), and a stent frame, wherein the main body includes proximal and distal openings at proximal and distal ends, and wherein the vascular prosthesis having a first terminal stent ring attached to the prosthetic material at at least one end, and wherein the vascular prosthesis has at least one thread element attached thereto, wherein the at least one thread element reduces the diameter of the respective distal or proximal opening by tensile loading.

9 Claims, 2 Drawing Sheets

(51) Int. Cl.
*A61F 2/06* (2013.01)
*A61F 2/82* (2013.01)
*A61F 2/966* (2013.01)

(52) U.S. Cl.
CPC ... *A61F 2002/067* (2013.01); *A61F 2002/075* (2013.01); *A61F 2002/077* (2013.01); *A61F 2002/821* (2013.01); *A61F 2002/828* (2013.01); *A61F 2002/9665* (2013.01); *A61F 2220/0091* (2013.01); *A61F 2250/006* (2013.01)

(58) Field of Classification Search
CPC .......... A61F 2002/077; A61F 2002/821; A61F 2002/828; A61F 2220/0091; A61F 2250/006; A61F 2002/9665
See application file for complete search history.

(56) References Cited

U.S. PATENT DOCUMENTS

| | | | |
|---|---|---|---|
| 11,660,179 B2* | 5/2023 | Geusen | A61F 2/07 623/1.13 |
| 2002/0002397 A1* | 1/2002 | Martin | A61F 2/07 623/1.12 |
| 2002/0143387 A1 | 10/2002 | Soetikno et al. | |
| 2002/0177890 A1* | 11/2002 | Lenker | A61F 2/90 623/1.12 |
| 2004/0054396 A1* | 3/2004 | Hartley | A61F 2/07 623/1.13 |
| 2004/0098084 A1* | 5/2004 | Hartley | A61F 2/962 623/1.11 |
| 2005/0119722 A1 | 6/2005 | Styrc et al. | |
| 2007/0043425 A1* | 2/2007 | Hartley | A61F 2/07 623/1.13 |
| 2007/0250153 A1* | 10/2007 | Cully | A61F 2/07 623/1.13 |
| 2008/0125845 A1 | 5/2008 | Fischer et al. | |
| 2008/0294234 A1* | 11/2008 | Hartley | A61F 2/954 623/1.13 |
| 2011/0125244 A1* | 5/2011 | Roeder | A61F 2/95 623/1.11 |
| 2012/0277734 A1 | 11/2012 | Goetz et al. | |
| 2013/0079870 A1* | 3/2013 | Roeder | A61F 2/07 623/1.35 |
| 2013/0116773 A1* | 5/2013 | Roeder | A61F 2/07 623/1.35 |
| 2013/0296999 A1 | 11/2013 | Burriesci et al. | |
| 2014/0172069 A1 | 6/2014 | Roeder et al. | |
| 2014/0336745 A1 | 11/2014 | Barthold et al. | |
| 2016/0270935 A1 | 9/2016 | Rasmussen et al. | |
| 2017/0189212 A1* | 7/2017 | Eller | A61F 2/844 |
| 2018/0303597 A1 | 10/2018 | Spindler | |
| 2020/0085561 A1 | 3/2020 | Derkvist | |

FOREIGN PATENT DOCUMENTS

| | | |
|---|---|---|
| DE | 102012101103 B3 | 7/2013 |
| DE | 102017111964 A1 | 12/2018 |
| EP | 2298248 A1 | 3/2011 |
| JP | 2009-504349 A | 2/2009 |
| JP | 2013-512013 A | 4/2013 |
| WO | WO 2007/022495 A1 | 2/2007 |
| WO | WO 2011/063972 A1 | 6/2011 |

OTHER PUBLICATIONS

International Search Report for International Application No. PCT/EP2020/071974, mailed Oct. 15, 2020.
Written Opinion for International Application No. PCT/EP2020/071974, mailed Oct. 15, 2020.
Notice of Reasons for Refusal for corresponding Japanese Patent Application No. 2022-508999, mailed Jan. 28, 2025.

* cited by examiner

VASCULAR PROSTHESIS

CROSS-REFERENCE TO RELATED APPLICATIONS

This application is a continuation of international patent application PCT/EP2020/071974, filed on Aug. 5, 2020, designating the U.S., which international patent application has been published in German language and claims priority from German patent application DE 10 2019 121 930, filed on Aug. 14, 2019. The entire contents of these priority applications are incorporated herein by reference.

BACKGROUND

The present invention relates to a vascular prosthesis for a blood vessel of a patient, comprising: a hollow cylindrical body having a stent frame and a prosthetic material attached thereto, the body having a longitudinal axis, an inner side and an outer side, and a proximal end with a proximal opening and a distal end with a distal opening.

SUMMARY

Vascular prostheses of this kind are generally known in the art. It is generally known to use vascular prostheses, also referred to as endovascular vascular stents/stent grafts, endoprostheses or endo-graft, for the treatment of weakened, injured, ruptured or aneurysmal vessels. The goal of endoluminal treatment of an aneurysm is to completely relieve the pressure on the diseased vessel segment in order to reliably prevent rupture. This requires a seal of the prosthesis against the deactivated lumen in the entire course, but especially in the area of the anchorage zones. For this purpose, a vascular prosthesis or stent graft is released at the diseased or injured site of the vessel, which restores the functionality of the original vessel or supports the still existing vessel integrity. In doing so, the implant causes correction or shielding of the lesion and/or redirection of blood flow. In this way, blood now flows through the vascular prosthesis and further stress on the bulge is prevented. The radial force of the vascular prosthesis is often sufficient to anchor it in the vessels.

An aneurysm is a widening or bulging of an arterial blood vessel due to congenital or acquired wall changes. The bulge may involve the vessel wall as a whole, or, as in the case of a so-called false aneurysm or dissection, blood may leak from the lumen of the vessel between the layers of the vessel wall and shear them apart. Failure to treat an aneurysm can lead to rupture of the artery in advanced stages, with the result that the patient bleeds to death internally.

The self-expanding vascular prostheses used to treat aneurysms generally consist of a hollow cylindrical metal frame or scaffold made of stainless steel or a metal alloy (usually a shape memory material; e.g., nitinol), and this usually consists of a wire mesh or meandering circumferential stent springs arranged one behind the other, which may be interconnected by wire connecting supports, or may be interconnected only by the prosthetic material. The cover surface (jacket) of the hollow-cylindrical metal frame is often covered with a textile or polymer film, resulting in a hollow-cylindrical body. The jacket is usually made of polyester (Dacron) or polytetrafluoroethylene (PTFE). The metal frame is often sutured to the prosthetic material with non-absorbable suture material.

Currently, vascular prostheses are available in diameters between 18 and 46 mm and sheathed/covered lengths between 90 and 250 mm. These can be extended proximally or distally by means of additional prostheses. In addition, custom-made vascular prostheses are also known. When purchased, the vascular prostheses are usually already pre-assembled in an insertion system. The vascular prosthesis is then inserted into the affected vessel by means of this insertion system via a stiff guide wire.

As a rule, the vascular prostheses are without sheathing ("bare springs") in their proximal end regions (10 to 20 mm). The "Bare Springs" secure the anchoring within the delivery system. The "bare springs" are therefore necessary during implantation of the vascular prosthesis, during which the delivery system is connected to the exposed stent rings of the vascular prosthesis so that targeted expansion of the vascular prosthesis at the desired location can be ensured.

For implantation, the vascular prosthesis is radially compressed so that its cross-sectional area is significantly reduced. For this purpose, the vascular prosthesis is located in the distal end of the sheath catheter of the delivery system and can be released by slowly withdrawing the sheath catheter.

During implantation, the vascular prosthesis is first brought into the area of the aneurysm with the aid of an insertion/delivery system, where it can be released in the correct position. In the delivery system, a fixation of the proximal stent graft springs is provided for this purpose. For this purpose, the first, i.e. proximally terminal, stent spring is hooked into a closing mechanism. This is usually possible because the first stent spring protrudes proximally from the stent graft and has no prosthetic material in this area. The fixation holds the first stent spring together in the delivery system and it can be released at any time by operating the release mechanism at the proximal end of the delivery system.

In this regard, the correct position of the stent can be controlled by X-ray markers provided on the sheath of the stent, particularly in the area of the opening for the supply of the branching blood vessels or in the area of the proximal and distal ends.

As mentioned above, the proximal fixation of the vascular prostheses is usually preferably released via a stent spring protruding from the textile sheath. It has been shown that this can result in numerous disadvantages. For example, vascular injuries often occur due to exposed, often pointed stent springs, so that in the worst case a new aneurysm can develop. Furthermore, there is a risk that the sheath catheter and guidewires may become entangled or "threaded" onto a free stent spring. The result would be dislocation of the vascular prosthesis and/or malfunction of the vascular prosthesis. In addition, the exposed springs may also cause damage to vascular prostheses that have already been presented. Also, partial deployment is not possible with such vascular prostheses, so blood flow is completely blocked during implantation.

Furthermore, when releasing a self-expanding vascular prosthesis, a critical issue is often that once the vascular prosthesis is released, it cannot be rotated or moved or displaced within the vessel in order to place it correctly, if necessary, otherwise there is a risk of injury to the vessels. The insertion systems known according to the prior art have exactly this disadvantage. This is particularly critical in the case of vascular prostheses with side branches, since these, after release of the vascular prosthesis, are intended to extend into the branching blood vessels.

To avoid these disadvantages, vascular prostheses known in the prior art are designed, for example, in such a way that the proximal stent spring is also sewn around/covered by prosthesis material. The fixation of the vascular prosthesis on/at the delivery system, which is necessary for its insertion into the vessel to be treated, is ensured by loops located inside the hollow cylindrical main body.

However, such vascular prostheses result in unnecessary material accumulation/packing density in the proximal loading area, necessitating a larger catheter diameter. Consequently, patients with narrower vessels cannot be treated. Another disadvantage of these vascular prostheses is that the guide hooks of the insertion system can get caught in the loops and the vascular prosthesis can shift during release. In addition, there may be increased thrombus formation, as blood components can adversely attach to the exposed loops.

In other vascular prostheses known in the prior art, metal loops protrude from the encased stent graft, to which a guide wire can be attached. Another disadvantage with these prostheses is that when the delivery system is retracted, it can get caught on the loops and thus dislodge the vascular prosthesis. With this vascular prosthesis, too, there is a risk of thrombus and ultimately embolism formation.

Therefore, there is still a great need for novel vascular prostheses that can be used for implantation into vessels and for the treatment of vascular diseases. In particular, the vascular prostheses should be such that simplified loading of the vascular prosthesis onto the insertion catheter, as well as simple insertion and delivery of the vascular prosthesis into the affected vessel, can be made effected.

Against this background, it is an object of the present invention to provide a vascular prosthesis as well as a suitable delivery system by means of which the vascular prosthesis can be easily loaded, compressed, introduced and released in such a way that the possibility of correct placement of the stents also immediately prior to the final release is guaranteed.

According to the invention, this object is solved by a vascular prosthesis for a blood vessel of a patient, comprising: a hollow cylindrical body having a stent frame and a prosthetic material attached thereto, the body having a longitudinal axis (L), an inner side and an outer side, and a proximal end with a proximal opening and a distal end with a distal opening, wherein a first self-expanding terminal stent ring is provided at the proximal end and/or distal end, the first stent ring being transferable from a compressed state to an expanded state, wherein the first stent ring is meandering circumferentially and has pointed arches and legs connecting the pointed arches, and wherein the first stent ring is attached to the prosthesis material on the outside of the main body, such, that no pointed arch of the first stent ring freely protrudes beyond the proximal and/or distal end, and further wherein at least one thread element is provided on the first stent ring, the thread element having a first end and a second end and wherein the thread element is firmly fixed with its first end to the first stent ring and is at least partially circumferentially movably guided on the vessel prosthesis in such a way that the first stent ring can be transferred from a radially compressed state into an expanded state via a tensile load or tensile relief of the at least one thread element.

The object is further solved by an insertion/delivery system for inserting a vascular prosthesis having at least one terminal stent ring into a vessel of a patient, the insertion system comprising: a catheter tube onto which the vascular prosthesis can be loaded for insertion into the blood vessel, a retraction sheath for compressing the vascular prosthesis in its loaded state, a fixation axially movable on the catheter tube, at least one thread element via which the terminal stent ring of the vascular prosthesis can be compressed or expanded by tensile loading or unloading/relieving of the at least one thread element.

The object of the invention is further solved by a method for inserting a vascular prosthesis into a blood vessel of a patient by means of the insertion system according to the invention, comprising the following steps:

Inserting a vascular prosthesis according to the invention, loaded onto a catheter tube and held compressed by a retraction sheath, into a blood vessel of a patient;

removing of the retraction sheath to release the main portion of the vascular prosthesis, leaving the proximal and/or distal end thereof fixated and compressed;

axially displacing the fixation to release/relief the at least one thread member and thereby expanding the distal and/or proximal end; and releasing the thread element from the fixation of the delivery system to fully release the distal and/or proximal end of the vascular prosthesis.

The object is further solved by the use of a vascular prosthesis according to the invention and/or an insertion/delivery system according to the invention for implantation into a blood vessel of a patient for the treatment of a vascular disease.

In this way, the objects underlying the invention are completely solved.

With the vascular prosthesis according to the invention or the insertion/delivery system according to the invention, it is possible to place the vascular prosthesis easily and extremely precisely. This is possible because the thread guidance allows the openings of the vascular prosthesis to be opened and, if necessary, closed again in a controlled manner. Uncontrolled immediate expansion of the vascular prosthesis after the sheath catheter is withdrawn is, thus, avoided. Instead, expansion is controlled so that the vascular prosthesis can be used for targeted partial expansion up to complete expansion in stages. In this case, the expansion is controlled by the thread guidance and the pulling or releasing of the thread element. A particular advantage of this vascular prosthesis is that after its placement, rotation is also possible, for example, in order to precisely place any side branches of the vascular prosthesis that may be provided for branching vessels.

The vascular prosthesis according to the invention provides a novel vascular prosthesis which can be used to support unstable, brittle or thrombosed vessel walls and in particular to treat aneurysmal vessels. The special design of the vascular prosthesis makes it easier for a surgeon to place the vascular prosthesis correctly in the injured vessel and to correct the position of the prosthesis, if necessary.

In particular, the hollow cylindrical prosthesis has a proximal opening at the proximal end and a distal opening at the distal end, each with a diameter (d).

According to the invention, the opening angle or the degree of opening of the proximal and/or distal opening of the vascular prosthesis can be controlled via the at least one thread element, especially after retraction of a retraction sheath previously holding the remaining vascular prosthesis in a compressed state. This enables the user to first place the vascular prosthesis, which is held compressed by a retraction sheath, for example, over its longitudinal axis, precisely in the vessel to be treated, and then to retract^^^^ the retraction sheath in order to expand the vascular prosthesis, whereby the opening or expansion of the proximal and/or distal opening of the vascular prosthesis can be controlled via the at least one thread element.

Furthermore, the vascular prosthesis according to the invention offers the advantage that the thread element, which enables targeted expansion of the opening of the vascular prosthesis, is anchored to the vascular prosthesis after expansion in such a way that it cannot become hooked in the delivery system, thus preventing dislocation of the vascular prosthesis.

In addition, the vascular prosthesis according to the invention has the advantage that it does not require the so-called "bare springs" as discussed at the outset, since the vascular prosthesis is designed in such a way that the proximal opening can be essentially flush with the prosthesis material. According to a preferred embodiment, the vascular prosthesis according to the invention is used as a vascular prosthesis which is partially inserted with its proximal and/or distal end, i.e. the end at which the thread element is located, into another vascular prosthesis for anchoring therein, whereby the vascular prosthesis forms a "stent within a stent" or a so-called "secondary" stent. The vascular prosthesis according to the invention prevents damage that can occur with two vascular prostheses known in the prior art that are guided into each other due to their exposed stent rings/stent springs in the overlapping region.

In other words, "free"—when referring to the protrusion of the pointed arches of the first terminal stent ring beyond the proximal and/or distal end—means that the prosthesis material is flush with the outermost tip of the pointed arches of the first terminal stent ring, i.e. that each area or section of the first terminal stent ring is covered with prosthesis material from either the inside or the outside of the vascular prosthesis.

According to the present invention, the first stent ring is a support element arranged perpendicular to the longitudinal direction at the proximal and/or distal end of the vascular prosthesis and meandering around and closed in a ring-like manner. The first stent ring has stent springs formed by pointed arches and legs/struts connecting them.

The term "meandering" is used herein to refer to any loop-shaped course of a stent ring. In this case, pointed arches or points are formed which point alternately in the proximal and distal directions, and which are connected to one another by straight struts or legs. According to a preferred embodiment, a stent ring has at least 4 pointed arches pointing in one (i.e. either proximal or distal) direction, in particular at least or exactly 4, 5, 6, 7, 8, or 9.

As used herein, "stent" or "stent element", "stent spring" or "stent ring" refers to any structure that provides an expansion force and/or a supportive function to a vascular prosthesis. Accordingly, a stent element is therefore any element that has the characteristics of the stent. In this document, the terms stent spring and stent ring are used interchangeably.

A stent ring is defined as any one-piece annular element which, due to its material, can be compressed and, after removal of the compression pressure, can expand again in a spring-like manner. The stent springs/rings have a wave-like circulation, with wave crests and wave troughs forming a phase and alternating with one another.

According to the invention, the at least one terminal stent ring is not connected to the rest of the stent frame of the vascular prosthesis, but is merely attached to the prosthesis material, preferably sewn on. It is preferred if the first terminal stent ring is not attached to the prosthesis material over its entire material surface, but is attached to the prosthesis material only over certain sections, for example only in the area of the pointed arches, so that the struts/legs connecting the pointed arches to one another are essentially not directly attached or sewn to the prosthesis material.

The stent ring may have equal or different circumferential amplitudes distributed around its circumference, which result from the legs of the stent springs being of equal or different lengths. Amplitudes of different lengths offer the advantage that the stent graft can be adapted to the respective vessels and their respective characteristics (curvature, branching vessels, taper, etc.).

According to the invention, the vascular prosthesis has a stent scaffold or frame which, according to a preferred embodiment, extends over the entire length of the vascular prosthesis and which is connected to the prosthetic material over the entire length.

According to the invention, the term "distal" is used to refer to the portion of the vascular prosthesis, or end, that is further downstream with respect to the bloodstream. The term "proximal", on the other hand, means, again with respect to the blood flow, a part or the end that is located further upstream with respect to the blood flow. In other words, the term "distal" means guided/provided in the direction of the blood flow and the term "proximal" means guided/provided opposite to the direction of the blood flow.

On the other hand, in the case of catheters, or delivery systems comprising catheters, the term "distal" means the end of the catheter or delivery system that is inserted into the patient or that is furthest from the user, and the term "proximal" means the end that is closer to the user.

According to the invention, either the proximal end or the distal end or both ends may have a first terminal stent ring that is fixedly secured to the prosthetic material of the vascular prosthesis. Conversely, therefore, unless specifically designated, "terminal" means either the proximal or distal end of the vascular prosthesis.

The attachment of the first thread element to the vascular prosthesis can be effected, for example, by sewing, knotting and/or gluing the first thread end to the vascular prosthesis, in particular to the vascular prosthesis material and/or the stent ring.

In the present context, a "thread element" is understood to be a thread or a cord of a certain length and having a first end and a second end, and in particular any fiber-twisted, flexible and inelastic structure made of plastic or metals, which has a dominant one-dimensional elongation and a uniformity in the longitudinal direction, and thereby has a first end, a second end and a certain length.

According to a further preferred embodiment, a second terminal stent ring is provided at the proximal and/or distal end, which, via the compression or expansion of the first stent ring, can be transferred from a compressed state to an expanded state, wherein the second stent ring is meandering circumferential and has pointed arches and struts/legs connecting them, and wherein the second stent ring is attached to the prosthesis material on the inner side of the main body in such a way that no pointed arch of the second stent ring projects freely beyond the proximal and/or distal end.

According to another preferred embodiment, the pointed arches of the first and second terminal stent rings are not superimposed at the proximal and/or distal ends on the inner side and outer side of the main body, so that the first and second terminal stent rings, separated by the prosthetic material, overlap at the struts/legs only, but not at the pointed arches.

This embodiment offers the advantage that the at least one end section is additionally stabilized by the second terminal stent ring.

According to one embodiment, it is preferred if the at least one thread element is firmly fixed with its first end to the vascular prosthesis in an area in which the first and/or second terminal stent ring is attached to the prosthesis material.

Accordingly, the at least one thread element can also be firmly fixed, for example sewn, knotted and/or glued, to the first or second terminal stent ring with the same suture which fixes the first and/or second terminal stent ring to the prosthetic material.

According to a preferred embodiment of the vascular prosthesis according to the invention, the length of the at least one thread element preferably corresponds to the length of an imaginary line connecting at least two, preferably three pointed arches pointing in the same (i.e. proximal or distal) direction.

Preferred thread element lengths are between about 10 mm and 100 mm, in particular between 10 mm and 50 mm.

In preferred embodiments, the diameter of the thread element can be between about or exactly 0.05 mm to about or exactly 1 mm.

Advantageously, the degree of opening of the vascular prosthesis can be controlled by the length of the at least one thread element.

The at least one thread element is circumferentially present in the first terminal stent ring of the vascular prosthesis partially, i.e., movably guided over its second free end, which is not fixedly attached to the vascular prosthesis. In this context, "circumferentially" means that the thread element is guided perpendicularly to the longitudinal direction of the vascular prosthesis, thus in the circumferential direction of the vascular prosthesis. Furthermore, "movably guided" or "movably attached" means that the thread element is fixed to the vascular prosthesis only via its first end, and is not firmly fixed to the prosthesis material and/or to the stent ring over its remaining length, in particular not over its second end, but is guided essentially—i.e. in a predetermined clearance or path—freely in such a way that the thread element can compress the terminal stent ring and close or reduce the vascular prosthesis opening comprising the stent ring and the thread element by tensile loading thereon, and can expand the terminal stent ring and open or enlarge the vascular prosthesis opening by tension relief.

Advantageously, the at least one thread element is thus guided starting from its fixed first end in one of the circumferential directions of the vascular prosthesis, i.e., to the right or to the left, wherein, according to a further preferred embodiment, the at least one thread element is guided regularly or irregularly alternately over and under struts/legs of the stent ring.

Thereby, according to a preferred embodiment, the thread element is guided at least partially and/or at one or more locations in the circumferential direction of the vascular prosthesis in a predetermined area.

According to a preferred embodiment, it is further preferred if the at least one thread element is present with its second end guided by a deflection. In this context, "deflection" means any element through which the thread element can be guided and/or pulled in a direction which differs from the circumferential direction which is predetermined starting from the fixing point of the first end of the thread element, e.g. is opposite, and/or points in the direction of the longitudinal axis.

The predetermined area, or the deflection through which the thread element is partially guided, can be limited or "predetermined", for example, by sutures and/or loops in the prosthetic material. In this way, the thread element is held in the predetermined area.

Accordingly, according to a preferred embodiment, the at least one thread element is guided at at least one point in the circumferential direction of the terminal stent ring between two sutures spaced apart from one another, preferably through two sutures/seams spaced apart from one another, via which the stent ring is fastened to the prosthesis material.

As mentioned above, this embodiment has the advantage of creating a deflection of the circumferentially guided thread element: The thread element is fixedly attached to the vascular prosthesis at its first end and is guided in one circumferential direction (rightward or leftward) over and under the struts of the first terminal stent ring and away from the point of fixation of the first end of the thread element; by providing the guidance of the at least one thread element through the two seams/sutures being apart from one another, the thread element can then be deflected in another direction, thereby compressing the stent ring, resp. thereby reducing the opening of the vascular prosthesis.

This guiding between two sutures can be done at one point in the circumferential direction or at several points in the circumferential direction. However, movement in the circumferential direction always remains possible.

Thus, the at least one thread element can be guided in a targeted manner and, if necessary, deflected in a different direction.

The at least one thread element can thereby further be present in a weblike manner, partially circumferentially around the vascular prosthesis. In this case, the at least one thread is "woven" or threaded circumferentially between the first stent ring and the prosthetic material in such a way that the thread element is guided alternately above and below the struts/legs of the first terminal stent ring. Again, the areas in which the at least one thread is to be guided can be predetermined by sutures connecting the prosthetic material to the first stent ring. The alternate guiding over and under the struts of the first terminal stent ring can be regular, i.e. always alternately below and above the successive struts, or irregular, for example over two successive struts and then under one strut, etc.

According to a further embodiment, it is preferred if the second end of the thread element has a loop via which the thread can be releasably fixed to a vascular prosthesis release system.

The loop can be formed, for example, by knotting or gluing the second end of the thread element in a loop-like manner. For this purpose, the second end of the thread element can be placed in a loop and fixed to the thread element in the section in front of the second end of the thread element by knotting, gluing, welding or other fastening measures. Advantageously, the thread element can thus be detachably hooked into a fixation system.

The vascular prosthesis according to the invention generally has two (end) states; the expanded state and the compressed state, wherein the compressed state can be achieved by compressing the vascular prosthesis about its longitudinal axis, for example, by a retracting sheath that keeps the vascular prosthesis compressed in the state loaded onto an introducer catheter by surrounding it. The first terminal stent ring is further—and thus separately or additionally—held compressed by tensile loading of the at least one thread element. With the removal of the retraction sheath, the vascular prosthesis expands—except for the first terminal stent ring or the opening of the vascular prosthesis comprising this stent ring, which can be opened separately by tension relief of the thread element.

Before loading the vascular prosthesis onto the delivery catheter (and also in the expanded form in the vessel), the at least one thread element is thus present loosely guided partially (e.g. over a length of two to four pointed bends) circumferentially around the vascular prosthesis. The end of the at least one thread element which is not firmly fixed to the vascular prosthesis is thus exposed. This end can be formed as a loop, for example. This facilitates pulling the thread and fixing it to the delivery catheter.

To compress the first terminal stent ring of the vascular prosthesis, the loose, free second end of the thread element can be pulled/tensioned. This reduces the diameter of the respective distal and/or proximal opening of the vascular prosthesis. This shortens the distance between the attached end of the thread element and the area where the thread element is free, causing the first stent ring to be contracted/compressed. Via the second free end of the thread element, the latter can be detachably attached to an insertion system for the vascular prosthesis, for example by hanging, for example the second end formed as a loop, in a fixation system provided for the thread element. To open the vascular prosthesis or the first stent ring, the fixation system for the thread element can then be moved axially over the introducer catheter in such a way that the loop is released again, so that tension relief is achieved, and so that the first stent ring or the opening can expand. "Releasable" fastening in this context means that, for loading the vascular prosthesis and compressing the at least one terminal stent ring, the second end of the thread element can be fastened to the delivery catheter or a fixation system provided therein/thereon in such a way that it can be released from the fixation system again, for example by mechanically influencing/operating the delivery catheter or the fixation system to open the at least one stent ring.

Accordingly, a tensile load is understood to be a tension or pull-movement exerted on the thread element, via which the thread element at least partially compresses the stent ring. By tension relief, on the other hand, it is understood that the thread element is guided on the vascular prosthesis without tension.

If the sheath catheter is withdrawn during implantation, the expansion of the terminal stent ring of the vascular prosthesis—and thus of the opening at which the stent ring is located—can be controlled by selective release of the second end of the thread element or by "loosening" or relieving the thread element. Thus, expansion of the terminal stent ring of the vascular prosthesis within a vessel can be controlled by fixation and loosening within the delivery system. After loosening of the thread fixation, the vascular prosthesis, which can be previously released in its remaining sections by retracting the sheath tube compressing them, is fully expanded. The thread element wraps itself circumferentially around the vascular prosthesis during release, being guided under and/or over the struts of the stent ring, so that after expansion of the vascular prosthesis in the vessel, the thread element is also clamped between the vascular prosthesis and the vessel wall.

According to one embodiment of the present invention, the at least one thread element may be formed of or comprise the same material as the prosthetic material of the vascular prosthesis, such as, for example, polyethylene terephthalate (PET), and/or of the same material as a suture material with which the at least first terminal stent ring is attached to the prosthesis material, such as UHMWPE (ultra-high molecular weight polyethylene), and/or of a superelastic material, such as NiTi, as well as other common surgical suture materials.

In the present context, hollow cylindrical body means the main body of the vascular prosthesis, which consists of a stent frame and at least partially of prosthetic material, with at least one end being covered. The stent frame may in turn be composed of individual stent rings/springs that are not connected to each other, or of a stent frame that is braided or lasered and whose elements are connected to each other.

According to one embodiment of the vascular prosthesis according to the invention, it is preferred if there are at least or exactly 2, at least or exactly 3, at least or exactly 4, at least or exactly 5, at least or exactly 6, at least or exactly 7, or at least or exactly 8 thread elements on the first stent ring, each of which is firmly fixed to the vascular prosthesis via its first end. According to a preferred embodiment, the vascular prosthesis has 5 thread elements, each of which is fixed to the vascular prosthesis via its first thread element end, in particular in the region of the first stent ring.

According to one embodiment of the vascular prosthesis according to the invention, the second, third and possibly each further thread element can be firmly fixed to the vascular prosthesis via the first terminal stent ring with its respective first end.

If the vascular prosthesis according to the invention has two or more thread elements, which are all fixed to the vascular prosthesis in the region of the first stent ring, the individual thread elements preferably each have the same length and are provided distributed over the circumference of the stent ring, so that in each case one thread element spans a section of the stent ring, for example over two or three pointed arches, or is threaded over two or three pointed arches. Via deflectors provided for the individual thread elements, sections of the stent ring can then be compressed via the thread elements when they are subjected to tensile load.

Accordingly, according to a preferred embodiment of the vascular prosthesis, deflectors corresponding to the number of thread elements are provided, i.e. preferably 2, 3, 4, 5, 6, 7, or 8.

The respective free second ends of the thread elements are, as described above, then detachably fastened, for example via a loop formed at the second end, to the fixing system of an insertion system for compressing the first stent ring.

The preferred features listed further above for the at least one thread element naturally also apply to the further thread elements.

According to another embodiment of the vascular prosthesis according to the invention, thread elements can also be provided on in the region/on a stent ring(s) which is arranged directly adjacent to the first terminal one in the direction of the other end of the vascular prosthesis. Thus, the corresponding end of the vascular prosthesis having the thread/filament elements can be controlled over a longer section and its opening can be selectively controlled. Advantageously, the vascular prosthesis can thereby be repositioned for a longer period of time.

Advantageously, the length of the thread elements can also be used to determine their number: the longer the thread elements, the fewer are necessary to control the opening of the vascular prosthesis opening and also the compression.

According to another embodiment, the vascular prosthesis has radiopaque markers.

Radiopaque markers have the advantage that the placement of the vascular prosthesis within the vessel can be monitored during implantation of the vascular prosthesis. In this regard, the markers are preferably located at the proximal and/or distal end portion of the vascular prosthesis. In this regard, the X-ray markers are preferably sutured or adhered to the prosthetic material. According to the invention, the marker either contains a radiopaque material or consists entirely of radiopaque material.

With the aid of the markers, which are located on specific points of the vascular prosthesis, it is possible to determine the exact position of the vascular prosthesis particularly quickly during and after implantation. Preferably, the radiopaque markers are made of one or more of the following materials, for example, gold, palladium, tantalum, chromium, silver, etc.; the shape of the markers can be arbitrary, for example, round, angular and/or, for example, have the shape of letters, numbers or figures that are helpful for the orientation of the vascular prosthesis in the vessel.

According to a preferred embodiment, the first and/or the second terminal stent ring has struts with the same length and/or different lengths.

According to a preferred embodiment, the second terminal stent ring has pointed arches facing the opening of the vascular prosthesis and having a uniform height, and pointed arches facing away from the opening of the vascular prosthesis and having a non-uniform height.

This embodiment has the advantage that your better compaction and thus a lower accumulation of material at the locations can be achieved.

According to a further embodiment, the vascular prosthesis has outgoing side branches.

This embodiment is particularly preferred if the vessel to be treated has outgoing side branches and a vascular prosthesis in this area would otherwise prevent the blood from flowing to the respective side branches. Accordingly, the number of side branches of the vascular prosthesis depends on the number of the respective outgoing vessels of the vessel to be treated.

In general, it is preferred if the diameter of the vascular prosthesis is adapted to the respective blood vessel of a patient to be treated, so that the diameter of the vascular prosthesis corresponds approximately to the diameter of the blood vessel. This is to ensure that the vascular prosthesis, due to its self-expanding properties, wedges itself into the vessel and cannot detach itself. If the diameter of the vascular prosthesis is chosen too small, for example, then the vascular prosthesis may shift unintentionally due to the blood flow.

According to a further embodiment, the prosthetic material comprises a material selected from a textile or a polymer, in particular comprising or formed from a material selected from polyester, polyurethane, polystyrene, polytetrafluoroethylene, ultrahigh molecular weight polyethylene (UHMPE) or mixtures thereof.

According to a further embodiment, the vascular prosthesis is self-expanding. It is preferred if the stent frame and/or the first and/or second stent ring are made of a self-expanding material, e.g. nitinol.

According to a preferred embodiment, the stent frame has non-terminal stent rings which are distributed one behind the other over the hollow cylindrical main body and are attached to the prosthesis material on its inner side and/or outer side.

These non-terminal stent rings can also not be connected to each other, but represent individual stent rings which—analogous to the at least one terminal stent ring—are formed in a meandering circumferential manner and have pointed arches and struts connecting them. The non-terminal stent rings can be firmly fixed to the outside and/or inside of the vascular prosthesis, e.g. by sutures or adhesive or other suitable fastening means.

According to another embodiment, it is preferred if the stent frame comprises a laser-cut or braided stent attached to the prosthetic material on the inside or outside of the hollow cylindrical scaffold.

As mentioned further above, the present invention also relates to an insertion/delivery system for inserting/delivering a vascular prosthesis of the invention into a blood vessel of a patient, the insertion system comprising, a catheter tube onto which the vascular prosthesis can be loaded for insertion into the blood vessel, a retraction sheath for compressing the vascular prosthesis in its loaded state, and a fixation axially movable on the catheter tube to which the at least one thread element of the vascular prosthesis is releasably attached.

According to one embodiment, it is preferred if the fixation is designed in such a way that via its axial displacement on the catheter tube, the at least one thread element can be compressed or expanded by tensile load or tensile relief of the first stent ring, and via this, if necessary, the second stent ring.

It is understood that the above-mentioned features and those still to be explained below can be used not only in the respective combination indicated, but also in other combinations or on their own, without leaving the scope of the present invention.

BRIEF DESCRIPTION OF THE DRAWINGS

Examples of embodiments of the invention are shown in the drawings and will be explained in more detail in the following description. Showing.

EMBODIMENTS

Figure 1A:
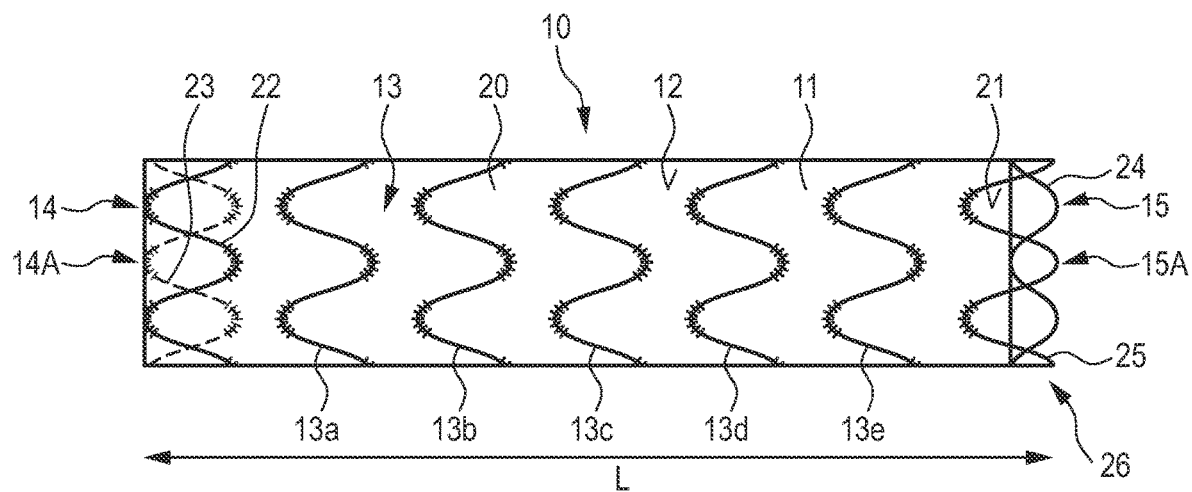
FIG. 1A a schematic representation of a first embodiment of a vascular prosthesis according to the invention.
Figure 1B:
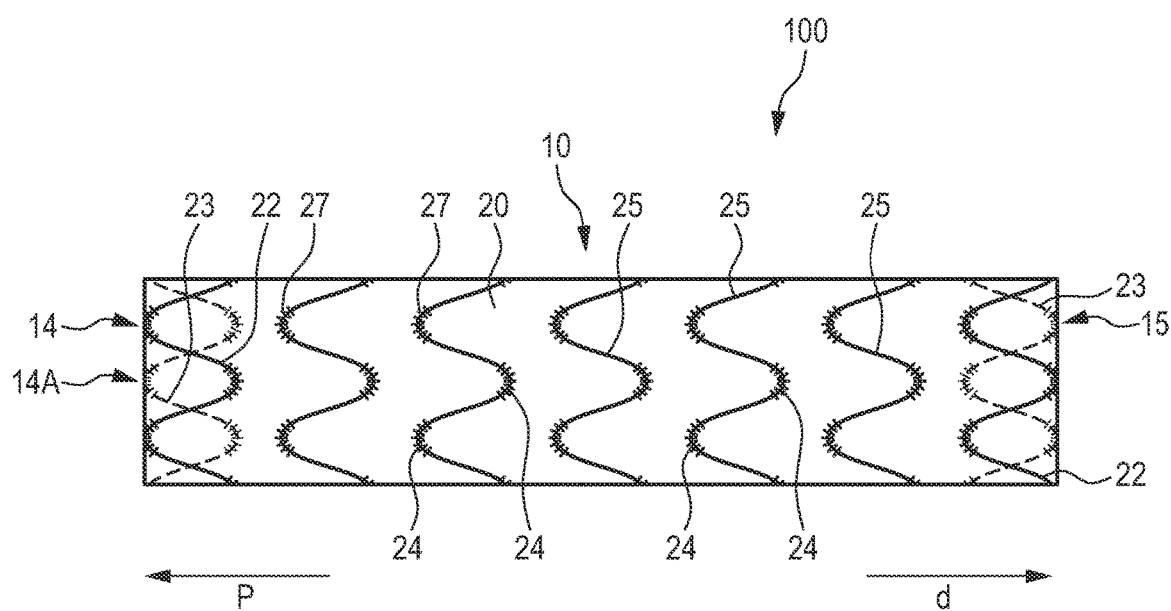
FIG. 1B a schematic representation of a second embodiment of a vascular prosthesis according to the invention.

FIGS. 1A and 1B show two embodiments of an exemplary vascular prosthesis according to the invention, which differ in a different distal end region, as will be explained below. The reference signs are the same for the corresponding features in both figures, although not all features in FIGS. 1A and 1B have been given reference signs for reasons of clarity.

In FIGS. 1A and 1B, 10 (FIG. 1A, and 100 (FIG. 1B) show/designate, respectively, in total a schematic, not to scale representation of a first embodiment of the vascular prosthesis according to the invention for implantation into a blood vessel of a patient, wherein the vascular prosthesis 10, 100 in the representation shown in FIGS. 1A and 1B is in the expanded state.

Figure 1C:
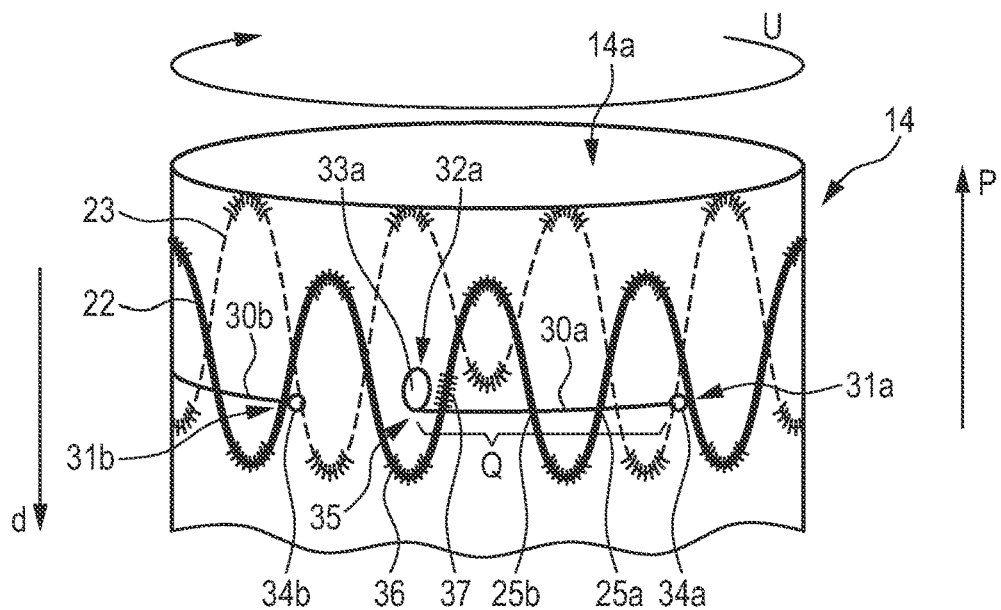
FIG. 1C a magnified view of the proximal end region of the embodiments shown in 1A and 1B.

The vascular prosthesis 10, 100 has a hollow cylindrical base or main body 11 with a prosthetic material 12 and a stent frame 13 attached thereto, which in the embodiment shown in FIG. 1 is a stent frame 13 comprising a plurality of stent rings, 13*a*, 13*b*, 13*c*, 13*d*, 13*e*, arranged in series. It is understood that, as explained further above, the stent frame 13 may also be in the form of a lasered or braided stent frame, in which cases the stent frame has cells between the braided or lasered stent material.

The vascular prosthesis 10, 100 in FIGS. 1A and 1B has a proximal end 14 and a distal end 15 with a proximal opening 14a and a distal opening 15a, a longitudinal axis L, and an outer surface/side 20 and an inner surface/side 21.

The proximal end 14 further includes a first terminal stent ring 22 and a second terminal stent ring 23, indicated by dashed lines in FIGS. 1A and 1B. In the embodiment shown in FIGS. 1A and 1B, the stent ring 22 is attached to the outer surface 20 of the vascular prosthesis 10, 100, and the second terminal stent ring 23 is attached to the inner surface 21 of the vascular prosthesis 10, 100.

In the embodiment shown in FIGS. 1A and 1B, the stent rings, 13a to 13e, 22 and 23 have pointed arches 24 and which point alternately in the proximal direction p and distal direction d, and which are connected to one another via struts/legs 25. The stent rings 13a to 13b, 22 and 23 are fixed to the prosthetic material by sutures 27, which are indicated by dashes in the figures.

As can be seen from FIG. 1, the prosthetic material and the outermost tips of the proximally facing pointed arches 24 of the terminal stent springs 22 and 23 are flush with each other so that no pointed arch protrudes freely beyond the prosthetic material 12, and so that both stent rings 22, 23 are completely covered by the prosthetic material 12.

The distal end 15 of the vascular prosthesis 10, 100 is different in FIGS. 1A and 1B in that the distal end 15 of the vascular prosthesis 10 shown in FIG. 1A has a terminal stent ring 26 with portions of its pointed arches 24 and struts 25 projecting beyond the prosthetic material 12.

In the distal end 15 of the vascular prosthesis 100 shown in FIG. 1B, the distal end 15, like the proximal end 14, is formed of stent rings 22, 23 fully covered with prosthetic material 12.

FIG. 1B shows an enlarged section of the proximal end 14 of the vascular prosthesis 10 of FIG. 1A, although according to the invention the distal end 15 can also or alternatively have the same design. The vascular prosthesis 10 has an outer surface/side 16 facing a vessel wall after implantation and an inner surface/side 17 facing the blood flow.

As can be seen from FIGS. 1A and 1B, the vascular prosthesis 10 has two stent rings on 18, 19 at the end portion, a first terminal stent ring 18 fixed to the outer side 16 of the vascular prosthesis 10 and a second terminal stent ring 19 fixed to the inner side 17 of the vascular prosthesis 10. The two stent rings 18, 19 are thereby fixed to the prosthesis material 12 by means of sutures 20, the sutures 20 not being distributed over the entire stent ring 18, 19, but being spaced apart from one another at specific intervals and at specific locations.

FIG. 10 shows an enlarged view of the proximal end 14 of the vascular prostheses 10, 100.

Two thread elements 30a and 30b are provided thereon, each having a first end 31a, 31b and a second end 32a (the second end of the second thread element 30b is not shown), and a length Q extending therebetween. In each case, the first end 31a, 31b is fixedly secured to the prosthetic material 12 via the stent ring 23 attached to the proximal end 14 from the inner side 24.

For reasons of clarity, only two thread elements 30a, 30b are shown in FIG. 10; further thread elements are provided in principle in the embodiment shown in FIG. 1 in order to compress the stent ring 22 and the stent ring 23 as a whole and thus to be able to close the opening 14a of the vascular prosthesis 10, 100.

The fixation may be performed at a strut 25 and/or pointed arch 24, for example by means of gluing and/or sewing to the stent ring 22 or 23 and/or to the prosthesis material 12.

The second end 32 of the thread element 30a has a loop 33. Starting from its fixing point 34a, the thread element 30a is alternately guided movably in the circumferential direction U over a first strut 25a and then under a second strut 25b. As can be seen from FIG. 10, the thread element 30a spans with its length Q essentially three pointed arches 24, two pointed arches pointing proximally p and one pointed arches 24 pointing distally d.

As mentioned above, further thread elements 30 (not shown) are provided in circumferential direction U to close and open the proximal opening 14a of the vascular prosthesis 10, 100. Each of these spans subsequent pointed arches or struts in the circumferential direction U.

Finally, the thread element 30a is passed between two spaced apart sutures 36, 37 at location 35 in the circumferential direction U of the terminal stent ring 22, thereby forming a deflection for the thread element 30a. The two spaced seams/sutures 36, 37 may be the same as those used to attach the stent ring 22 to the prosthetic material 21.

The thread element 30a is guided on the stent ring 22 in such a way that the thread element 30, at least at this point 35, can move only to a very limited extent proximally p and distally d, i.e. in the area bounded by the two seams/sutures 36, 37, while on the other hand it can be guided movably in the circumferential direction u.

When the thread element 30a is pulled at the second end 32a, the tensile load compresses the portion of the stent ring 22 traversed by the thread element 30a due to the deflection formed by the two seams/sutures 36, 37. With a proximal tensile load, the loop 33a or the second end 32a of the thread element 30a can be extended beyond the proximal end 14 of the vascular prosthesis 10, 100 and, when loaded onto an insertion/delivery system (discussed below), can be releasably hooked/fastened into it via the loop 33a.

In the same manner, the second (and any further thread element 30) thread element 30b can be guided and provided with a tensile load so that the stent ring section spanned by this thread element 30b can be compressed.

It is understood that the length of the thread elements 30a, 30b also determines their number: the longer the thread elements, the fewer are necessary to control the opening of the vascular prosthesis opening 14a and also the compression.

In the example shown in FIG. 1, 5 thread elements are provided.

Figure 2:
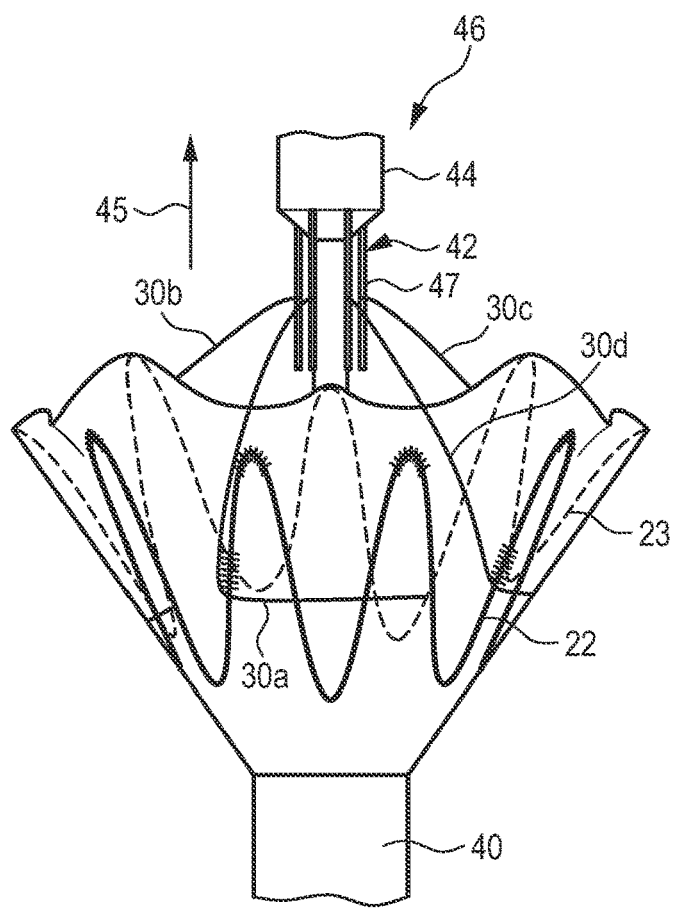
FIG. 2 a schematic representation of a section of a vascular prosthesis according to the invention, with the vascular prosthesis opening partially open, with the thread elements still attached to the insertion/delivery system.

FIG. 2 shows the proximal end 14 of the vascular prostheses shown in FIGS. 1A and 1B in a partially opened and expanded state, respectively: the first stent ring 22 and the second stent ring 23 of the vascular prosthesis 10, 100 are partially expanded, with the remaining portion of the vascular prosthesis 10, 100 still held compressed by a retraction sheath 40 of an insertion system 46 (which is shown only in part in FIG. 2).

FIG. 2 further shows four thread elements 30a, 30b, 30c, 30d, which are detachably secured with their respective second ends 32a, 32b, 32c, 32d into a fixation 42 of a catheter tube 44. The opening or expanding of the vascular prosthesis 10, 100 can be controlled as a function of the thread element length Q. After releasing this proximal fixation of the thread element 30a, 30b, 30c, 30d to the delivery system 46, for example by axially moving the fixation 42 in the direction of the arrow 45, the second ends 32a, 32b, 32c, 32d of the thread elements 30a, 30b, 30c, 30d are released and the vascular prosthesis 10, 100 can self-expand. Here, the thread elements 30a, 30b, 30c, 30d are again guided around the circumference of the vascular prosthesis 10, 100 via the respective deflection and placed in the blood vessel between the vascular prosthesis 10, 100 and vessel wall.

For loading the vascular prosthesis 10, 100 onto an insertion system 46, it is held compressed on a catheter tube 44 by a retraction sheath 40 about its longitudinal axis. The proximal end 14 (or distal end 15) or proximal opening 14a (distal opening 15a) of the vascular prosthesis 10, 100 is thereby additionally closed via the thread elements 30a, 30b, 30c, 30d by means of tensile loading by hooking the second ends 32a, 32b, 32c, 32d of the thread elements 30a, 30b, 30c, 30d into the fixation 42 via their loops 33.

The fixation shown in FIG. 2 is a system of several elongated fixation rods, preferably corresponding to the number of thread elements, which are axially movably/slidably guided in the catheter tube. Alternatively, multiple thread elements can also be mounted via one fixation rod. Details of an exemplary insertion system with a fixation as described herein are disclosed, for example, in EP 1 920 739, the contents of which are hereby made the subject matter in their entirety.

For insertion of the vascular prosthesis according to the invention into a blood vessel of a patient with the aid of an insertion system 46, the vascular prosthesis 10, 100, which is loaded onto the catheter tube 44 and held compressed by a retraction sheath 40, is inserted into a blood vessel of a patient, after proper placement thereof, the retraction sheath is removed to release the main portion of the vascular prosthesis 10, 100, leaving the proximal (or distal) end fixed and compressed and thus the corresponding opening of the vascular prosthesis closed. This allows repositioning of the vascular prosthesis to be easily effected, should this be necessary, without injuring the blood vessel at that location. Subsequently, the axial fixation is displaced to relieve the tension on the thread elements 30a, 30b, 30c, 30d, whereby the tension exerted on the thread elements 30a, 30b, 30c, 30d can be selectively and—if desired—gradually relieved, so that the opening 14a, 15a of the vascular prosthesis 10, 100 can also be gradually opened. Provided that the second ends of the thread elements 30a, 30b, 30c, 30d are released altogether from the fixation, the proximal/distal end 14, 15 of the vascular prosthesis 10, 100 is completely opened.

What is claimed is:

1. A vascular prosthesis configured for a blood vessel of a patient, comprising:
   a hollow cylindrical main body having a stent frame and a prosthetic material attached thereto, the main body having a longitudinal axis (L), an inner side and an outer side, and a proximal end with a proximal opening and a distal end with a distal opening,
   a first self-expanding terminal stent ring provided at the proximal end and/or the distal end, the first terminal stent ring configured to be transferred from a compressed state to an expanded state, wherein the first terminal stent ring is meanderingly circumferential and has pointed arches and struts connecting the pointed arches, which pointed arches have outermost tips, and wherein the first terminal stent ring is attached to the prosthesis material on the outer side of the main body in such a way that no pointed arch of the first terminal stent ring projects freely beyond the proximal and/or the distal end, and wherein the prosthetic material is flush with the outermost tip of the pointed arches of the first terminal stent ring,
   at least one thread element provided on the first terminal stent ring, the at least one thread element having a fixated first end and a free second end, without the fixated first end and the free second end being knotted together, wherein the free second end of the thread element terminates in a closed loop via which the thread element is configured for detachably fixing to a vascular prosthesis insertion system, and wherein the at least one thread element is sewn with its fixated first end to a second terminal stent ring of the vascular prosthesis, wherein the second terminal stent ring is fixed to the prosthesis material on the inner side of the main body, and wherein the thread element is guided circumferentially and movably on the vascular prosthesis in such a way that the first terminal stent ring can be transferred from a radially compressed state into an expanded state via a tensile load or tensile relief of the at least one thread element, wherein the at least one thread element is threaded circumferentially between the first stent ring and the prosthetic material in such a way that the thread element is guided alternately over and under struts of the first terminal stent ring and away from a fixation point of the fixated first end of the thread element, and wherein the at least one thread element, via its free second end, is guided at least at one point in the circumferential direction of the first terminal stent ring between two spaced-apart seams, the two spaced-apart seams securing the first terminal stent ring to the prosthesis material, thereby being deflectable from the circumferential direction into another direction, and
   the second terminal stent ring being located at the proximal and/or distal end, the second terminal stent ring configured to be transferred from a radially compressed state to an expanded state via compression and/or expansion of the first terminal stent ring, wherein the second terminal stent ring is meanderingly circumferential and has pointed arches and struts connecting the pointed arches, which pointed arches have outermost tips, and wherein the second terminal stent ring is fixed to the prosthesis material on the inner side of the main body in such a way that no pointed arch of the second terminal stent ring projects freely beyond the proximal and/or distal end, and wherein the prosthetic material is flush with the outermost tip of the pointed arches of the second terminal stent ring.

2. The vascular prosthesis according to claim 1, wherein between 2 and 8 thread elements are provided.

3. The vascular prosthesis according to claim 1, wherein the pointed arches of the first and the second terminal stent rings are arranged non-overlapping at the proximal and/or distal end on the outer side and the inner side on the main body, and that the first and second terminal stent ring, separated by the prosthesis material, intersect at the struts.

4. The vascular prosthesis according to claim 1, wherein the first terminal stent ring has struts of equal length.

5. The vascular prosthesis according to claim 1, wherein the second terminal stent ring has struts of different lengths.

6. The vascular prosthesis according to claim 1, wherein in the second terminal stent ring pointed arches are provided which point towards the proximal or distal opening of the vascular prosthesis and which have a uniform height, as well as pointed arches which point away from the proximal or distal opening of the vascular prosthesis and which have a non-uniform height.

7. The vascular prosthesis according to claim 1, wherein the vascular prosthesis has outgoing side branches.

8. The vascular prosthesis according to claim 1, wherein the stent frame further comprises non-terminal stent rings which are distributed one behind the other over the hollow cylindrical main body and are attached to the prosthesis material on its inner side and/or outer side.

9. The vascular prosthesis according to claim 1, wherein the stent frame further comprises a laser-cut or perforated stent attached to the prosthetic material at the inner side and/or outer side of the hollow cylindrical main body.

* * * * *